US012771408B2

(12) United States Patent
Lyu et al.

(10) Patent No.: US 12,771,408 B2
(45) Date of Patent: Oct. 20, 2026

(54) RECONFIGURABLE INTELLIGENT SURFACE-ASSISTED FLEXIBLE WIRELESS NETWORK

(71) Applicant: Dell Products L.P., Round Rock, TX (US)

(72) Inventors: Yongxia Lyu, Ottawa (CA); Tejinder Singh, Manotick (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/758,036

(22) Filed: Jun. 28, 2024

(65) Prior Publication Data

US 2026/0005729 A1 Jan. 1, 2026

(51) Int. Cl.
*H04B 7/04* (2017.01)
*H04B 7/06* (2006.01)

(52) U.S. Cl.
CPC ....... *H04B 7/04013* (2023.05); *H04B 7/0691* (2013.01)

(58) Field of Classification Search
CPC . H04B 7/04013; H04B 7/0404; H04B 7/0691
(Continued)

(56) References Cited

U.S. PATENT DOCUMENTS 9,852,079 B2 12/2017 Kepner et al.
12,512,879 B2 12/2025 Bai et al.
(Continued)

FOREIGN PATENT DOCUMENTS

CN 115334521 A 11/2022
EP 3 729 038 B1 4/2025
(Continued)

OTHER PUBLICATIONS

Y. Zhuang, J. Cappos, T.S. Rappaport et al., "Future Internet bandwidth trends: An investigation on current and future disruptive technologies", Secure Systems Lab, Dept. Comput. Sci. Eng., Polytech. Inst. New York Univ., New York, NY, USA, Tech. Rep. TR-CSE-2013-04, Nov. 1, 2013. 27 pages.
(Continued)

*Primary Examiner* — Young T. Tse
(74) *Attorney, Agent, or Firm* — Amin, Turocy & Watson, LLP

(57) ABSTRACT

The technology described herein is directed towards subdividing a reconfigurable intelligent surface into subarrays, or rectangular segments of unit cells, for different functions/operations. The subdividing can be dynamic, such as based on different performance-based allocations, and each segment can have a separate directivity or array gain. Control signal data from a base station or user equipment instructs a controller of the reconfigurable intelligent surface to change the respective numbers of unit cells for the various respective functions/operations, which can include a receive-and-forward function from the base station via the reconfigurable intelligent surface to user equipment, and a receive-and-forward function from the user equipment via the reconfigurable intelligent surface to the base station. There can be one subarray for receiving control information at the reconfigurable intelligent surface from the base station, and one subarray for transmitting control information back to the base station.

20 Claims, 12 Drawing Sheets

(58) Field of Classification Search
USPC ........ 375/259, 260, 262, 265, 267; 370/328, 370/334, 338, 344; 455/424, 425, 426.1, 455/426.2, 517, 524
See application file for complete search history.

(56) References Cited

U.S. PATENT DOCUMENTS

| | | | |
|---|---|---|---|
| 12,609,732 B2 | 4/2026 | Sahraei et al. | |
| 2017/0084306 A1 | 3/2017 | Xia et al. | |
| 2021/0232240 A1 | 7/2021 | Smith | |
| 2022/0377730 A1 | 11/2022 | Yang et al. | |
| 2023/0129288 A1* | 4/2023 | Sun | H04B 7/04026 375/267 |
| 2023/0209642 A1 | 6/2023 | Jiang et al. | |
| 2023/0216572 A1 | 7/2023 | Elshafie et al. | |
| 2023/0258759 A1 | 8/2023 | Wang et al. | |
| 2023/0268650 A1 | 8/2023 | Swartz et al. | |
| 2023/0361816 A1* | 11/2023 | Yang | H04B 7/04013 |
| 2023/0370958 A1 | 11/2023 | Gunzelmann et al. | |
| 2024/0056129 A1 | 2/2024 | Duan et al. | |
| 2024/0097743 A1* | 3/2024 | Bhamri | H04B 7/04013 |
| 2024/0337722 A1* | 10/2024 | Shrivastava | H04W 64/006 |
| 2024/0364434 A1 | 10/2024 | Sahraei et al. | |
| 2024/0365152 A1 | 10/2024 | Elshafie et al. | |
| 2024/0380438 A1 | 11/2024 | Elshafie et al. | |
| 2024/0413868 A1* | 12/2024 | Haghighat | H04L 25/0204 |
| 2025/0138179 A1 | 5/2025 | Fakhreddine et al. | |
| 2025/0150118 A1* | 5/2025 | Ali | H04B 7/04013 |
| 2025/0202563 A1 | 6/2025 | Elshafie et al. | |
| 2025/0323689 A1* | 10/2025 | Jagyasi | H04B 7/0626 |
| 2026/0012227 A1 | 1/2026 | Albanese et al. | |
| 2026/0025168 A1 | 1/2026 | Huang et al. | |
| 2026/0088856 A1 | 3/2026 | Hemadeh et al. | |
| 2026/0113077 A1 | 4/2026 | Huang et al. | |
| 2026/0121692 A1 | 4/2026 | Huang et al. | |
| 2026/0142691 A1 | 5/2026 | Prasad et al. | |
| 2026/0149487 A1 | 5/2026 | Noh et al. | |
| 2026/0163609 A1 | 6/2026 | Sahraei et al. | |
| 2026/0180624 A1 | 6/2026 | Bae et al. | |

FOREIGN PATENT DOCUMENTS

| | | |
|---|---|---|
| JP | 2011-130329 A | 6/2011 |
| KR | 10-2022-0125294 A | 9/2022 |
| WO | 2023/161428 | 8/2023 |
| WO | 2023/230300 A1 | 11/2023 |
| WO | 2024/125781 A1 | 6/2024 |

OTHER PUBLICATIONS

M. Poulakis, "Metamaterials Could Solve One of 6G's Big Problems [Industry View]," in Proceedings of the IEEE, vol. 110, No. 9, pp. 1151-1158, Sep. 2022. 8 pages.

L. Subrt and P. Pechac, "Controlling Propagation Environments Using Intelligent Walls," Subrt, L., & Pechac, P. (2012). Controlling propagation environments using Intelligent Walls. 2012 6th European Conference on Antennas and Propagation (EUCAP). doi:10.1109/eucap.2012.620651. 2012. 5 pages.

N. Kaina, M. Dupre, G. Lerosey, and M. Fink, "Shaping complex microwave fields in reverberating media with binary tunable metasurfaces," Scientific Reports, vol. 4, pp. 1-7, Published: Oct. 21, 2014. 8 pages.

L. Dai, B. Wang, M. Wang et al., "Reconfigurable Intelligent Surface-Based Wireless Communications: Antenna Design, Prototyping, and Experimental Results," in IEEE Access, vol. 8, pp. 45913-45923, Mar. 2, 2020. 11 pages.

Caner Guclu, Julien Perruisseau-Carrier, and Ozlem Aydin Civi. "Proof of Concept of a Dual-Band Circularly-Polarized RF MEMS Beam-Switching Reflectarray" IEEE Transactions on Antennas and Propagation, vol. 60, No. 11, Nov. 2012, 5 pages.

Khaira, et al. "Remote Controlled Reconfigurable Intelligent Surface With Modular Scalable Design for Flexible Radio Coverage With Adjustable Signal Strength", U.S. Appl. No. 18/536,565, filed Dec. 12, 2023, 53 pages.

Khaira, et al. "Remote Controlled Reconfigurable Intelligent Surface", U.S. Appl. No. 18/640,596, filed Apr. 19, 2024, 37 pages.

ETSI GR RIS 001 V1.1.1, "Reconfigurable intelligent surfaces (RIS); Use); Use Cases, Deployment Scenarios and Requirements" Apr. 2023, 29 pages.

ETSI GR RIS 002 V1.1.1, "Reconfigurable intelligent surfaces (RIS); Technological challenges, architecture, and impact on standardization" Aug. 2023, 33 pages.

ETSI GR RIS 003 V1.1.1, "Reconfigurable intelligent surfaces (RIS); Communication Models, Channel Models, Channel estimation and Evaluation Methodology" Jun. 2023, 59 pages.

Invitation to Pay Additional Fees for PCT Application No. PCT/US2024/013740 mailed Sep. 17, 2024, 11 pages.

Singh et al. "Communication Links Allocation and Slicing of Reconfigurable Intelligent Surface Using Modular Hardware for Flexible Wireless Network" U.S. Appl. No. 18/795,003, filed Aug. 5, 2024, 52 pages.

International Search Report and Written Opinion mailed Jan. 24, 2025 for PCT Application No. PCT/US2024/013740, 24 pages.

Sayanskiy Andrey et al: "A 2D-Programmable and Scalable Reconfigurable Intelligent Surface Remotely Controlled via Digital Infrared Code", IEEE Transactions on Antennas and Propagation, vol. 71, No. 1, Jan. 2023, 11 pages.

Kisseleff Steven et al: "Reconfigurable Intelligent Surfaces in Challenging Environments: Underwater, Underground, Industrial and Disaster", IEEE Access, Special Section on Reconfigurable Intelligent Surgace Aided Communications for 6G and Beyond, vol. 9, Nov. 2021, 20 pages.

Non-Final Office Action received for U.S. Appl. No. 18/536,565 dated Feb. 3, 2026, 17 pages.

Notice of Allowance received for U.S. Appl. No. 18/640,596 dated Apr. 21, 2026, 9 pages.

Liaskos et al., "End-to-End Wireless Path Deployment with Intelligent Surfaces Using Interpretable Neural Networks", In IEEE Transactions on Communications, vol. 68, No. 11, Nov. 2020, pp. 6792-6806.

Notice of Allowance received for U.S. Appl. No. 18/536,565 dated Apr. 14, 2026, 7 pages.

Notice of Allowance received for U.S. Appl. No. 18/795,003 dated Jul. 7, 2026, 18 pages.

Notification Concerning Transmittal of International Preliminary Report on Patentability for PCT Application No. PCT/US2024/013740 dated Jun. 25, 2026, 15 pages.

* cited by examiner

RECONFIGURABLE INTELLIGENT SURFACE-ASSISTED FLEXIBLE WIRELESS NETWORK

BACKGROUND

Reconfigurable intelligent surfaces (alternatively referred to as intelligent reflective surfaces, or metasurfaces) are manmade thin reflective or refractive surfaces whose electromagnetic response can be electronically controlled. Reconfigurable intelligent surfaces are characterized by their two-dimensional arrays of electronically controllable reflecting elements, referred to as unit cells, that can dynamically manipulate electromagnetic waves by altering attributes such as phase, amplitude, and direction of a redirected incoming signal. These elements have dynamically controllable properties, facilitated through control signaling, enabling the manipulation of incident wireless signals via reflection, refraction, focusing, collimation, modulation, absorption, or a combination thereof.

In practical mobile communication systems, the uneven coverage of wireless signals, often resulting from obstacles such as buildings, trees, vehicles, and other mobile entities, can lead to instances of weak coverage. Strategic deployment of a reconfigurable intelligent surface offers a cost-effective and readily-implementable solution to an otherwise weak coverage area by establishing clear line-of-sight propagation paths between an access point, the reconfigurable intelligent surface, and terminals (including user equipment) within the weak coverage area, thereby enhancing overall coverage.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
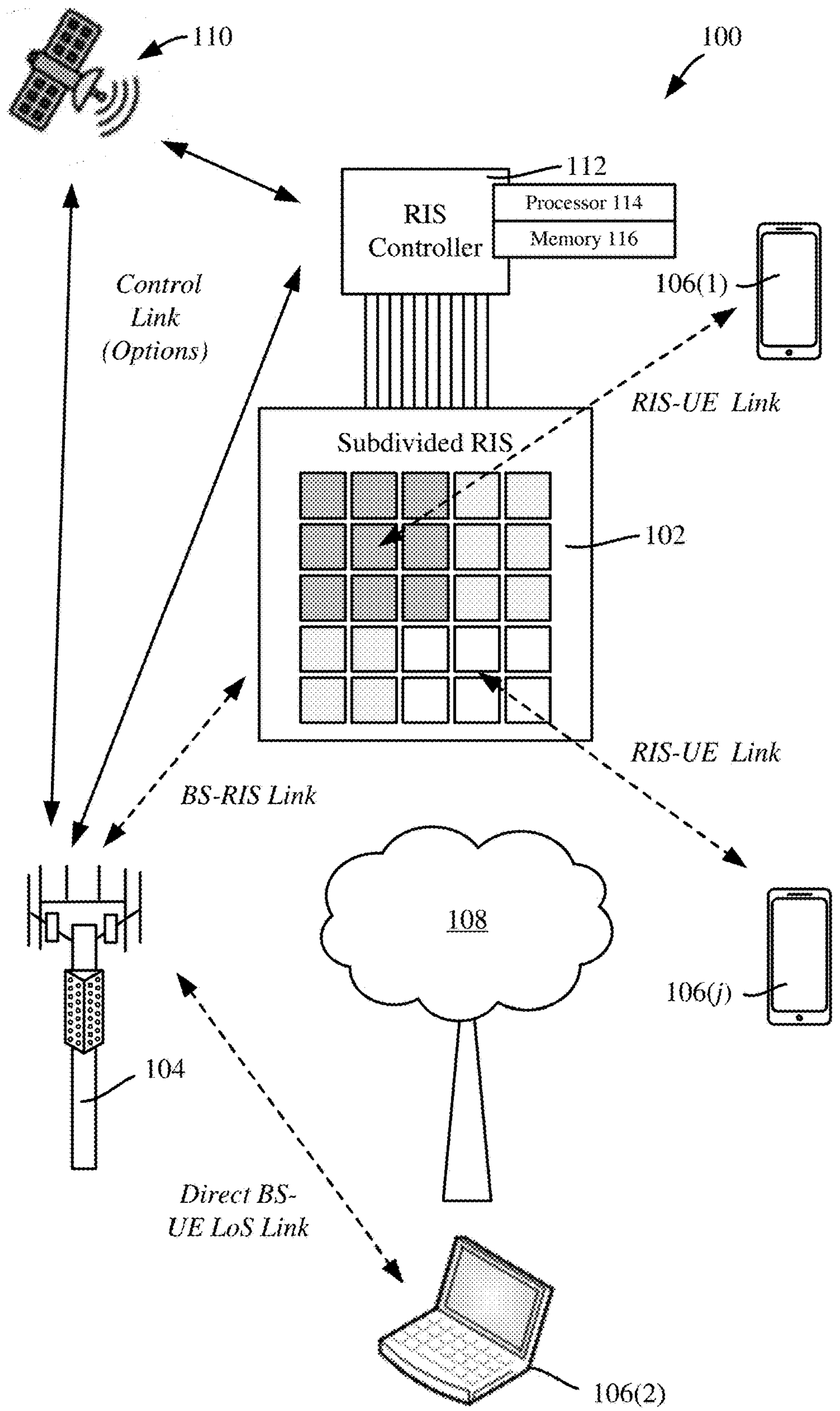
FIG. 1 is a block diagram showing an example system in which a reconfigurable intelligent surface is subdivided into subarrays (segments) of unit cell groupings, in accordance with various example embodiments and implementations of the subject disclosure.

The technology described herein is generally directed towards reconfigurable intelligent surface slicing in which a reconfigurable intelligent surface (RIS) can be subdivided into portions (subarrays, or rectangular segments of unit cells) for different functions/operations, e.g., for different performance-based allocation. The unit-cell allocation of the reconfigurable intelligent surface facilitates dynamic adjustment of an individual link's performance gain in a flexible wireless network. For example, a base station (including any type of access point) can send control signal data that instructs a controller of the reconfigurable intelligent surface to change the respective numbers of unit cells for various respective functions/operations. In this way, for example, reconfigurable intelligent surface processing gain for one otherwise weak communications link can be increased by having an increased number of unit cells allocated for that link to improve the gain with respect to that link. The respective allocated portions for respective links can be reconfigured dynamically as deemed appropriate, e.g., based on current environmental conditions, for example.

As will be understood, such dynamic slicing of the reconfigurable intelligent surface panel into segments for performance-based allocation can be based on a control signal received by a controller coupled to the reconfigurable intelligent surface's unit cells. In one implementation, the control signal can include unit cells' allocation information, e.g., for one segment to operate as a receive-and-forward link, that is, cells that receive a radio frequency (RF) signal from the base station, and transmit/forward the RF signal to user equipment (UE or UEs). Similarly, a segment (the same or a different segment) can be configured as a receive-and-forward link that receives an RF signal from a UE and forwards the RF signal to the base station. There can be one receiver segment that receives an RF signal from the base station, e.g., for control information communications to the reconfigurable intelligent surface's controller. Similarly, there can be one transmitter segment utilized for transmitting signals from the reconfigurable intelligent surface's controller to the base station. Alternatively, the receiver and transmitter links can share the same subarray of unit cells, at one time acting as a receiver, and another time acting as a transmitter.

In one example implementation, the reconfigurable intelligent surface controller can report the maximum number of unit cells/RIS elements to the base station as a capability of the reconfigurable intelligent surface. The reconfigurable intelligent surface controller can report back a maximum number of unit cells in each subarray (segment) after allocation of a certain portion of the unit cells for certain links; one segment can be used for the base station-to-reconfigurable intelligent surface control link; another segment can be allocated to be used as a reconfigurable intelligent surface-to-base station backhaul link, and another for a reconfigurable intelligent surface-to-UE link, for example. The information can indicate time slot allocation for associated unit cells allocated for one receive-and-forward segment and another receive-and-forward segment, and/or for receiver and transmitter segments. The information can indicate frequency domain allocation for associated unit cells allocated for one receive-and-forward segment and another receive-and-forward segment, and/or for receiver and transmitter segments.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a reconfigurable intelligent surface 102 capable of being subdivided into different subarrays unit cells, (in which individual unit cells are represented as squares within the reconfigurable intelligent surface 102). As described herein, in one implementation the different subarrays (differently-shaded unit cell groupings) are rectangular segments of unit cell groupings that do not intersect with one another. A base station 104, or access point, which can be a gNodeB (gNB), 6G RAN node, O-RAN architecture total radiated power (TRP) of gNB, (hereinafter referred to as a base station in a wireless network) communicates with user equipment (UE) 106(1)-106(*j*). The communications can be direct line of sight (LoS) between the base station 104 and a user equipment (e.g., 106(2)), or via the reconfigurable intelligent surface 102. Although not explicitly shown in FIG. 1, any of the user equipment can be mobile or fixed, and there can be more than one reconfigurable intelligent surface in the communications link between the base station and a user equipment.

In general, and as represented in FIG. 1, each wireless link can go through a time-varying wireless channel with potential scatters, moving and/or fixed obstacles (e.g., 108), as well as unwanted interference from other reconfigurable intelligent surface(s) or neighbor base station(s). As such, a strategically located reconfigurable intelligent surface 102 can redirect the signals to and from the base station 104 and the user equipment (UE) 106(1)-106(*j*) around any obstacle and/or to help mitigate interference. Moreover, the reconfigurable intelligent surface 102 can be configured to alter characteristics of the reflected instance of the incoming signal, such as to provide constructive interference by which targeted user equipment (one or more UEs) benefits from array gain in a certain direction/at a certain distance, even without active amplification.

A reconfigurable intelligent surface (RIS) controller 112 (comprising at least one of processor 114 and at least one of memory 116) can alter the individual unit cells' phases, for example, to change the redirected/retransmitted signal instance. For example, the base station 104 can send control data to the RIS controller 112 as described herein, whereby the RIS controller 112 can dynamically change the properties of the individual unit cells. In particular, the properties can be dynamically changed per unit cell in each subarray (segment) as described herein, such as to perform different functions/operations, and the subarrays can be dynamically increased or decreased in size with respect to their total number of unit cells. Note that the base station 104 can communicate the control data directly through part of the RIS surface, directly through a wired or other wireless link, or alternatively indirectly through an intermediary (e.g., the satellite 110); this can depend on where the RIS is deployed, e.g., nearby where a wired connection is feasible, or remote whereby a wireless link is advantageous. Note that there can be more than one intermediary between a reconfigurable intelligent surface and the base station, and indeed, multiple reconfigurable intelligent surfaces may be present as part of any communication link.

To summarize, the unit cells of the reconfigurable intelligent surface have the capability to change at least one of the properties of the incident electromagnetic (EM)/radio frequency (RF) waves, including frequency, amplitude, phase, and/or polarization. The radio wave can be at least redirected or retransmitted towards another direction, such as after reflecting off of (or being refracted by) the reconfigurable intelligent surface, depending on the design of reconfigurable intelligent surface 102. The reconfigurable intelligent surface controller 112 refers to the reconfigurable intelligent surface component that is responsible for reconfiguring the reconfigurable intelligent surface elements to achieve a desirable way of manipulation of the incident radio wave, potentially processing any signaling received from another network node. In practice, the controller 112 provides distribution of the actuation signals to each of the unit cells, e.g., to a varactor or other variable tuning device of the unit cell which alters its phase based on applied bias control voltage. Inside a reconfigurable intelligent surface, one interface is the interface between the reconfigurable intelligent surface controller 112 and reconfigurable intelligent surface 102 to transmit the control signals.

Figure 2:
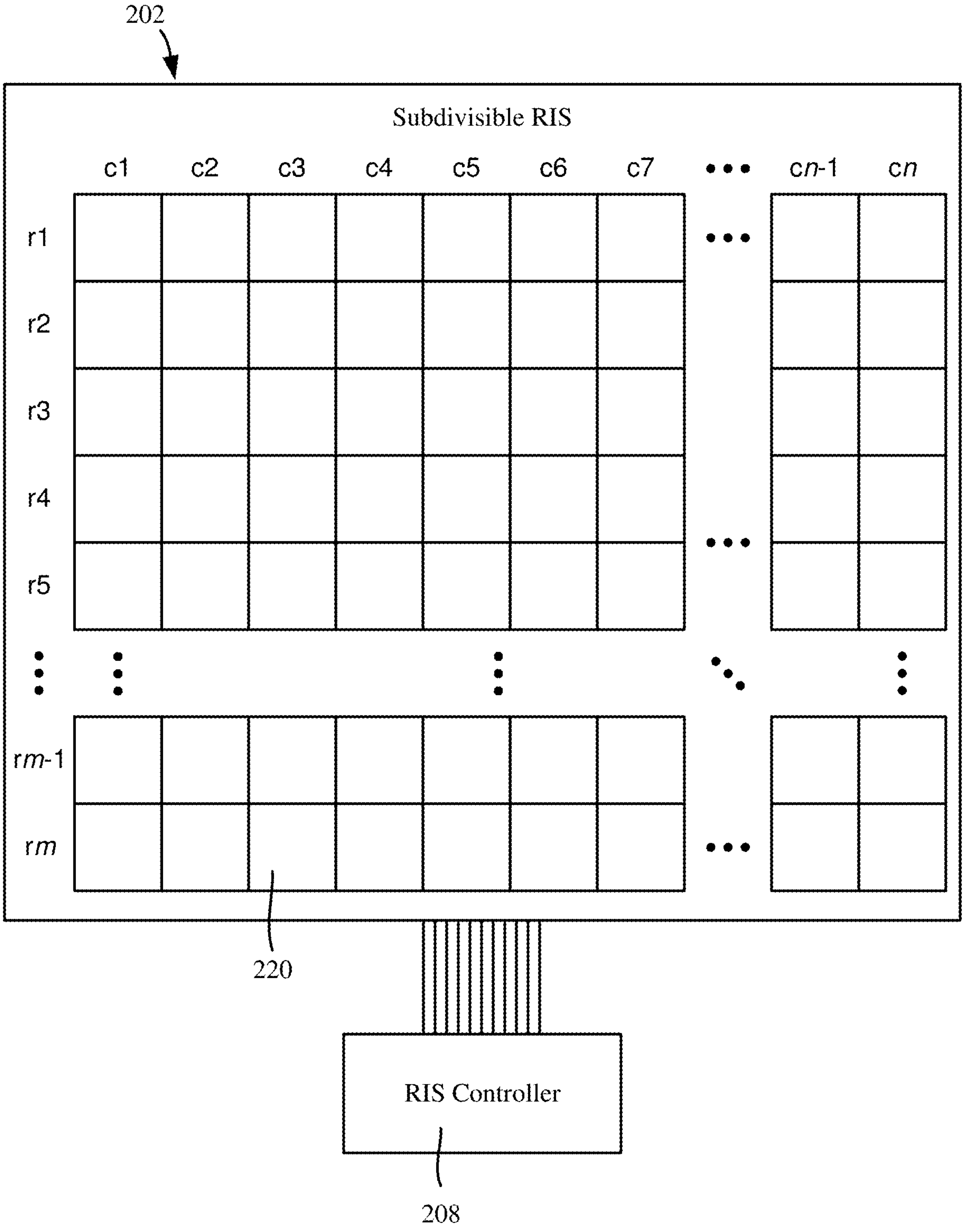
FIG. 2 is a top view representation of an example reconfigurable intelligent surface (RIS) capable of being divided by a RIS controller into subarrays of unit cell groupings, in accordance with various example embodiments and implementations of the subject disclosure.

As shown in FIG. 2, in general, a generalized reconfigurable intelligent surface panel or simply a reconfigurable intelligent surface 202 includes a certain number of elements or unit cells (represented as squares) distributed in rows (r1, r2, r3, . . . , rm-2, rm-1, rm) and columns (c1, c2, c3, . . . , cn-2, cn-1, cn). One of the unit cells is labeled 220 in FIG. 2. There is thus a reconfigurable intelligent surface 202 with a total size of rm×cn unit cells depicted in FIG. 2, controlled by at least one reconfigurable intelligent surface controller 208 (corresponding to the controller 112 of FIG. 1).

In general, a reconfigurable intelligent surface has a beamforming gain=20 log (number of unit cells); the reconfigurable intelligent surface receiver gain or transmitter gain is thus proportional to the number of unit cells used/activated for a receiver and/or a transmitter in a wireless link. For a given reconfigurable intelligent surface panel, the number of unit-cell(s) used/activated for a base station-reconfigurable intelligent surface link and reconfigurable intelligent surface-UE link can be informed by the base station or the UE to improve weaker coverage between the base station-reconfigurable intelligent surface link and/or the reconfigurable intelligent surface-UE link. For example, when the base station knows that the base station-to-reconfigurable intelligent surface link is a weaker coverage link between the base station-reconfigurable intelligent surface link and the reconfigurable intelligent surface-UE link, based on reported measurement results from the reconfigurable intelligent surface, the base station can inform the reconfigurable intelligent surface to use a greater number of unit cells for the base station-reconfigurable intelligent surface link, and use a lesser number of unit cells for reconfigurable intelligent surface-UE link, as per a straightforward computation of unit cells.

Figure 3:
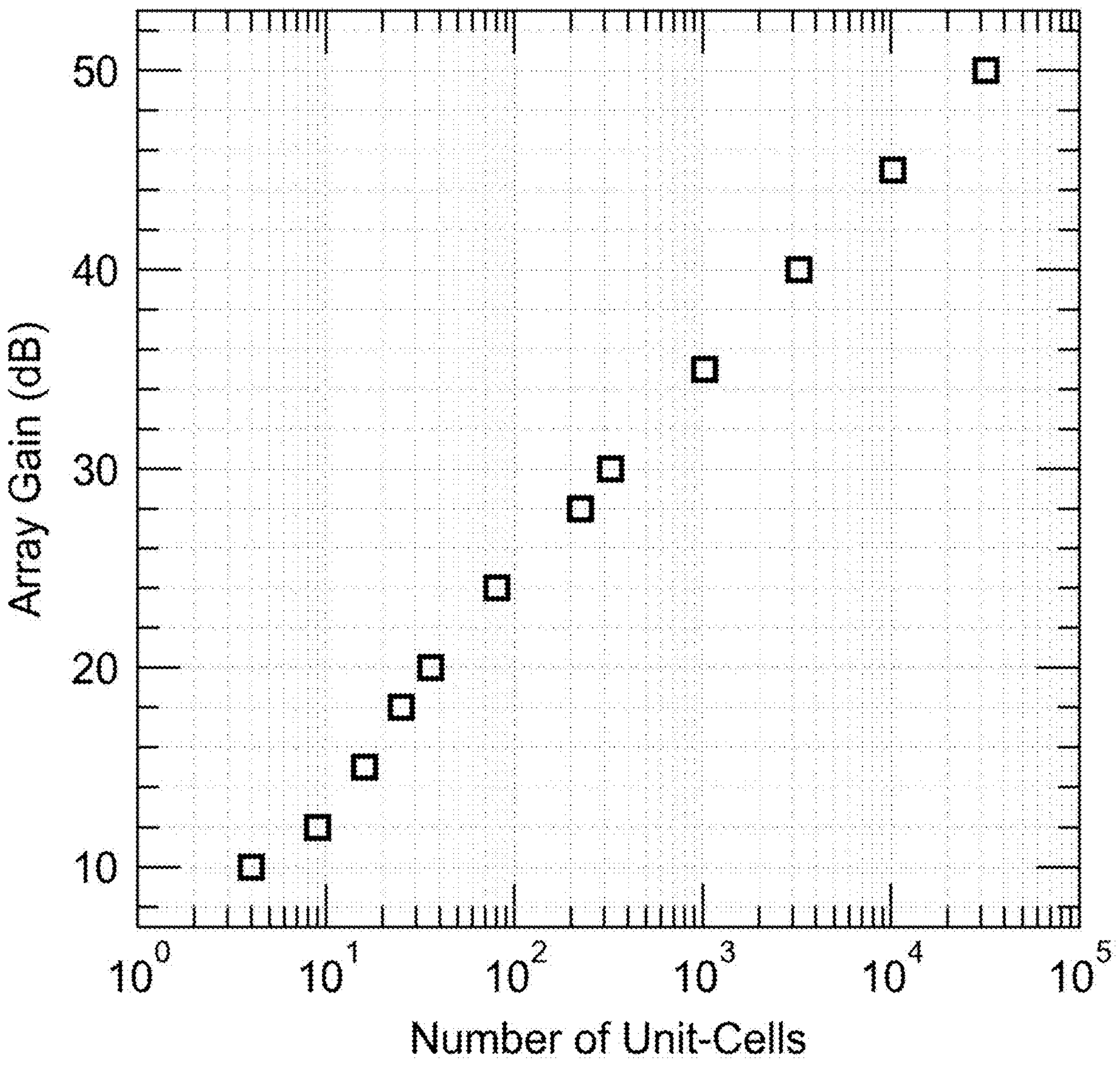
FIG. 3 is an example graphical representation of a total number of unit cells of a RIS needed to achieve specific array gain, in accordance with various example embodiments and implementations of the subject disclosure.

Because as described herein the information about the total number of available cells is given to (or previously known to) the base station, the control link can optimize the ratio or slicing of the reconfigurable intelligent surface appropriately, as the array gain is independent of the frequency and depends only on the number of unit cells used. For example, FIG. 3 shows the total number of unit-cells (note that the x-axis is plotted using a log scale) needed to achieve a specific array gain, in dB, which is independent of the frequency of operation. As can be readily appreciated, the gain based on the total number of unit cells can be for an entire RIS, or for a smaller allocated subarray of unit cells. Note that once a reconfigurable intelligent surface is deployed, the size of reconfigurable intelligent surface panel is fixed; in other words, the maximum number of unit-cell/reconfigurable intelligent surface elements in the reconfigurable intelligent surface panel are fixed, which can be known in advance to the base station.

As described herein, a reconfigurable intelligent surface may be introduced into a communications system because the direct link between the base station and UE, also called a base station-UE link, may be obstructed sufficiently or even completely due to blockage, and/or because the base station-UE link is a weak communication link due to a highly fading propagation environment and cannot be utilized (such as corresponding to a low RSSI (received signal strength indicator) or SINR (signal-to-interference-plus-noise ratio)). A reconfigurable intelligent surface may be introduced into the wireless system to add one more fading paths for the UE to improve spectral efficiency, even when a direct base station-UE link is present.

Any individual link can have the weakest coverage, or a dynamically varying coverage "hole" issue, which depends on a real time varying environment. One implementation can fully utilize the reconfigurable intelligent surface for dynamic gain allocation, or alternatively as described herein, can allocate a certain number of unit cells or a ratio of used/unused cells for a specific link.

Figure 4:
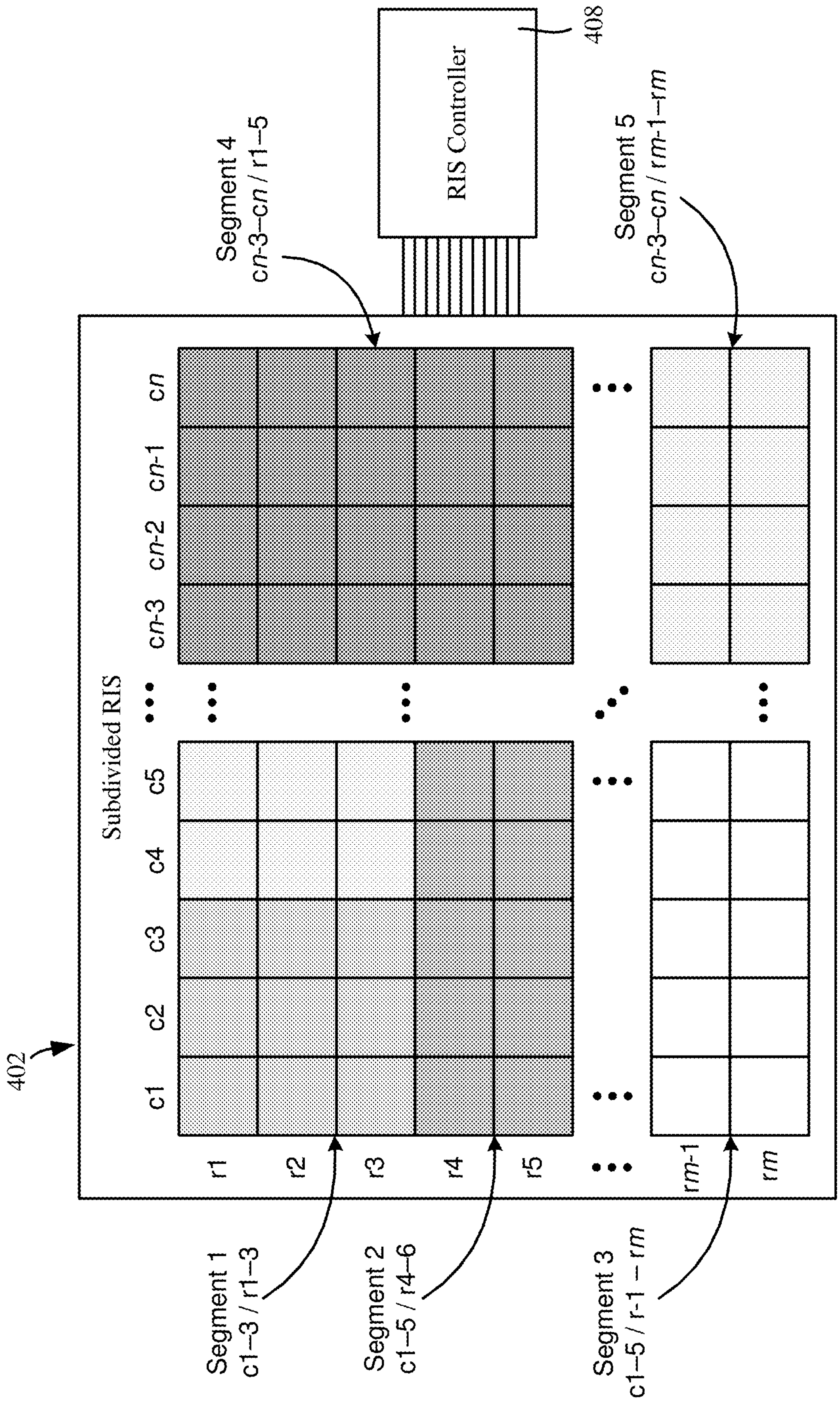
FIG. 4 is a top view representation of an example RIS highlighted with various distributed segments consisting of smaller subarrays of unit cells, in which each segment can have a separate directivity or array gain, in accordance with various example embodiments and implementations of the subject disclosure.

One example distribution or slicing of a subdivided reconfigurable intelligent surface panel to achieve dynamic array gain is shown in FIG. 4, where segments can be formed in the subdivided reconfigurable intelligent surface 402, with each segment including a certain number of cells (column-wise and/or row-wise). The various segments in FIG. 4 of the reconfigurable intelligent surface highlight the distribution of the smaller subarrays of unit cells, in which each segment can have a separate directivity and/or array gain.

As shown in FIG. 4, a Segment 1 is formed using cells c1-3 and r1-3, totaling 9 cells, while a separate Segment 2 is formed using cells c4-5 and r1-3, totaling 6 cells. Similarly, to fully utilize the panel, various dynamic segments can be formed by the reconfigurable intelligent surface controller 408 after receiving instructions from the base station, e.g., for any weaker wireless link. In this way, the total number of cells in a segment can be used as a performance indicator, or the ratio of the panel can also be used for such. For example, if a reconfigurable intelligent surface 402 has one-hundred total unit cells, and no allocation has been done, then the first Segment 1 can be formed anywhere between four percent (4%) up to the 100% of the available unused cells; thus the ratio of the Segment 1 to the size of the panel can be allocated as anywhere between 4:100 to 100:100. If the Segment 1 only needs a certain array gain, such as corresponding to 10% of the panel, then 90% of the panel is still unused and can be used towards forming other segments.

Figure 5:
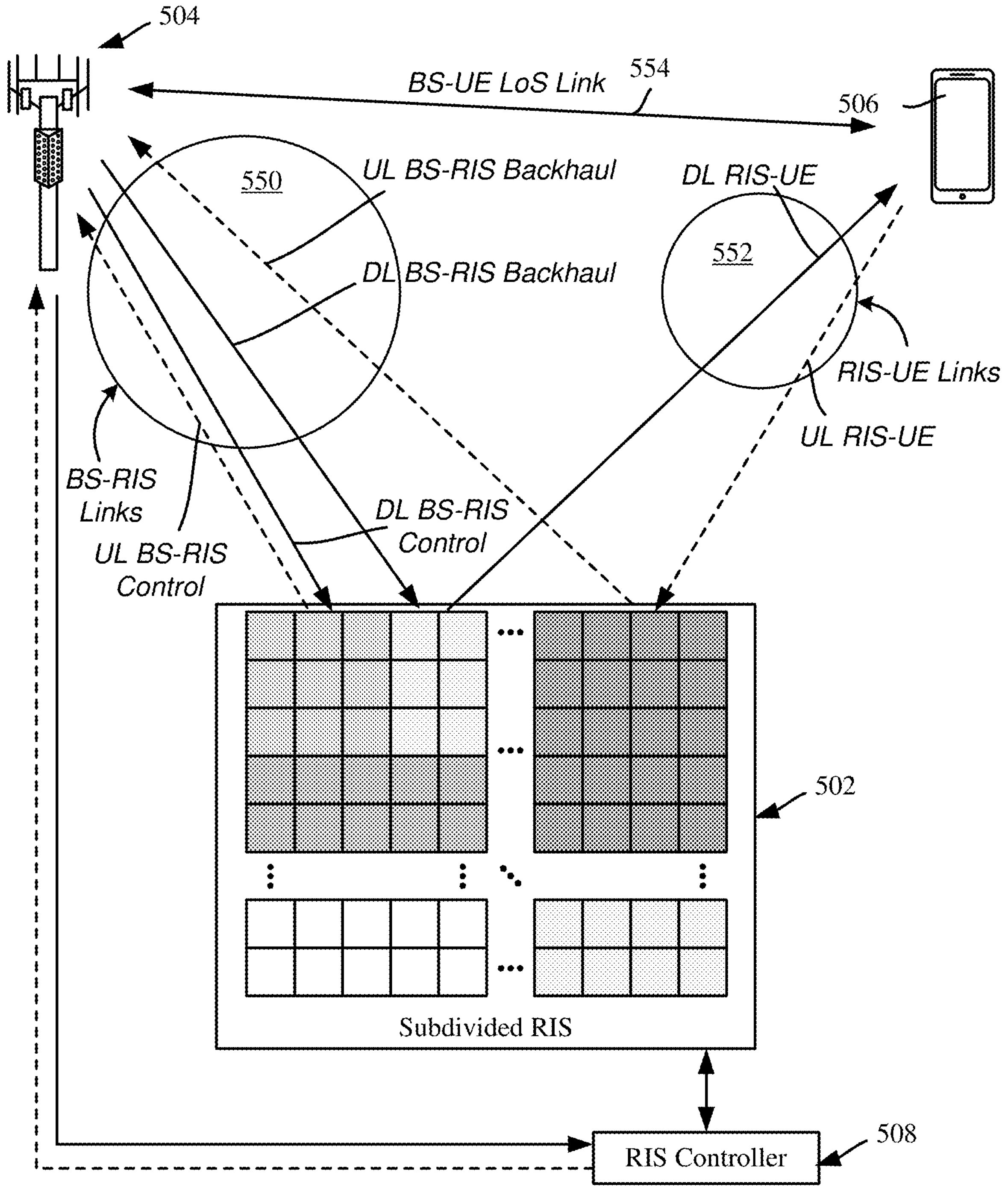
FIG. 5 is a top view representation of one example distribution of the communication links in a RIS-assisted wireless communication system based on a subdivided RIS, in accordance with various example embodiments and implementations of the subject disclosure.

FIG. 5 shows an example of a base station 504 and UE 506 with a reconfigurable intelligent surface (RIS) 502 deployed in between, in which there is a distribution of the communication links in a reconfigurable intelligent surface-assisted wireless communication system. In general, there are base station-RIS links 550, RIS-UE links 552, and a base station-UE (line-of-sight) link 554.

As shown in FIG. 5, the base station-reconfigurable intelligent surface links 550 can include a base station-RIS control link (for uplink (UL) and downlink (DL) control signal data), and a base station-reconfigurable intelligent surface backhaul link (for uplink and downlink communications data). The base station-reconfigurable intelligent surface control link can be used to exchange control information between the base station and the reconfigurable intelligent surface's controller 508; the control information can be used for the control of the unit cells/subarrays thereof of the reconfigurable intelligent surface 502. The base station-reconfigurable intelligent surface backhaul link and reconfigurable intelligent surface-UE link are allocated to receive-and-forward the uplink and downlink RF signals between the base station and the UE(s). In other words, as the reconfigurable intelligent surface panel receives an RF signal from the base station on the downlink subarray of the base station-RIS backhaul link, the reconfigurable intelligent surface forwards the RF signal to the UE on the downlink-allocated subarray of the RIS-UE link. When the reconfigurable intelligent surface panel receives an uplink RF signal from UE on the uplink subarray of the RIS-UE link, and forwards the signal to the base station on UL of the base station-RIS backhaul link.

Figure 6:
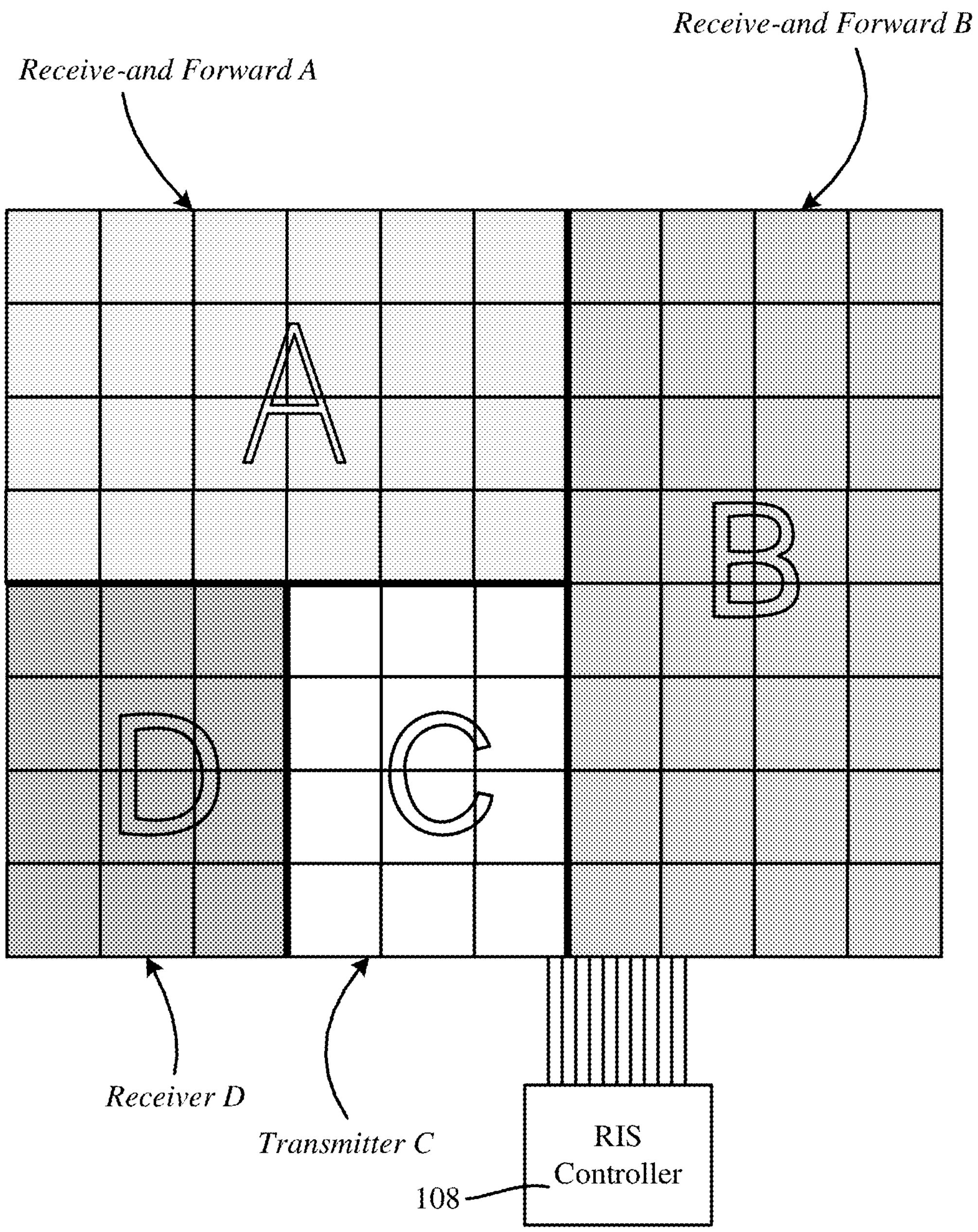
FIG. 6 is a top view representation of an example unit cell subarray allocation with two receive-and-forward segments and remaining subpanels allocated as a transmitter segment and a receiver segment, in accordance with various example embodiments and implementations of the subject disclosure.

FIG. 6 shows another unit cell allocation, with a first receive-and-forward segment A, a second receive-and-forward segment B of a RIS 602. There is also one subarray (segment/subpanel) allocated to operate as a transmitter segment C, and another allocated to operate as a receiver segment D. A difference from FIG. 5 is that in FIG. 6, there are separate transmitter (segment C) and receiver (segment D) subarrays of unit cells. Thus, the reconfigurable intelligent surface receives a control signals from the base station on the downlink portion of the of the base station-reconfigurable intelligent surface's control link (receiver segment D) and transmits control signals to the base station on the uplink segment (transmitter segment C) of the base station-RIS control link. Along with the two receive-and-forward RF signal segments between the base station and UE, the reconfigurable intelligent surface panel in FIG. 6 has four functions, namely receive-and-forward segment A, which receives signal from the base station and transmits/forwards the RF signal to the UE; receive-and-forward segment B, which receives the RF signal from UE and forwards the RF signal to the base station; receiver segment D, which receives the RF signal at the RIS from the base station; and transmitter segment C, which transmits signals from the RIS to the base station. Note that the segment distribution in the dynamic and flexible scheme of FIG. 6 has allocated 100% of the RIS panel's unit cells to enhance the wireless coverage.

Figure 7:
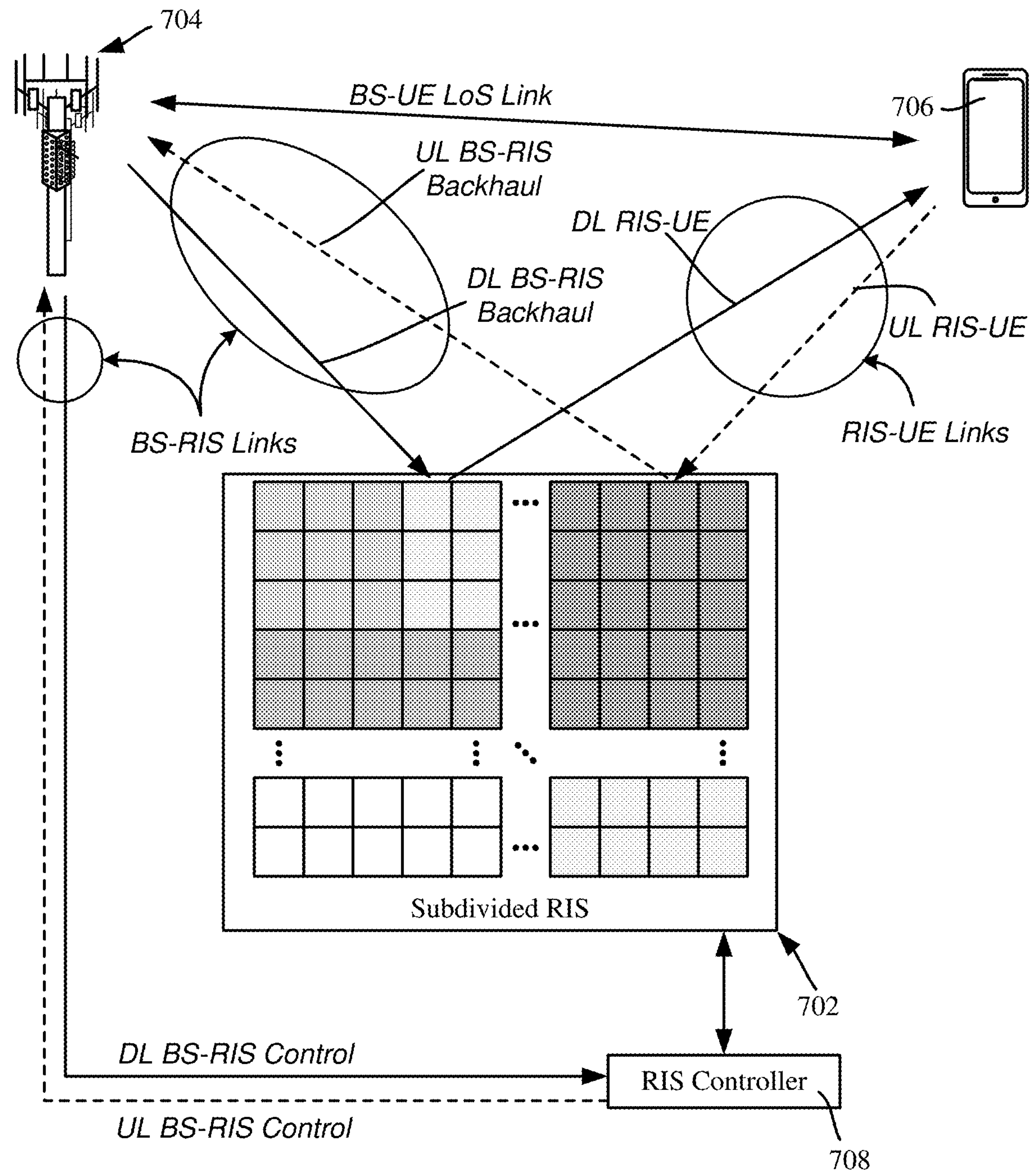
FIG. 7 is a top view representation of another example distribution of the communication links in a RIS-assisted wireless communication system based on a subdivided RIS, in accordance with various example embodiments and implementations of the subject disclosure.

FIG. 7 shows another alternative implementation, in which a RIS controller 708 is coupled to the base station external to the RIS panel 702. As a result, more unit cells are available for non-control functions, particularly larger receive-and-forward subarrays, or receive-and-forward subarrays that steer redirected signals towards different directions and/or with wider (shorter distance) beams, or narrower (longer distance) beams.

Figure 8:
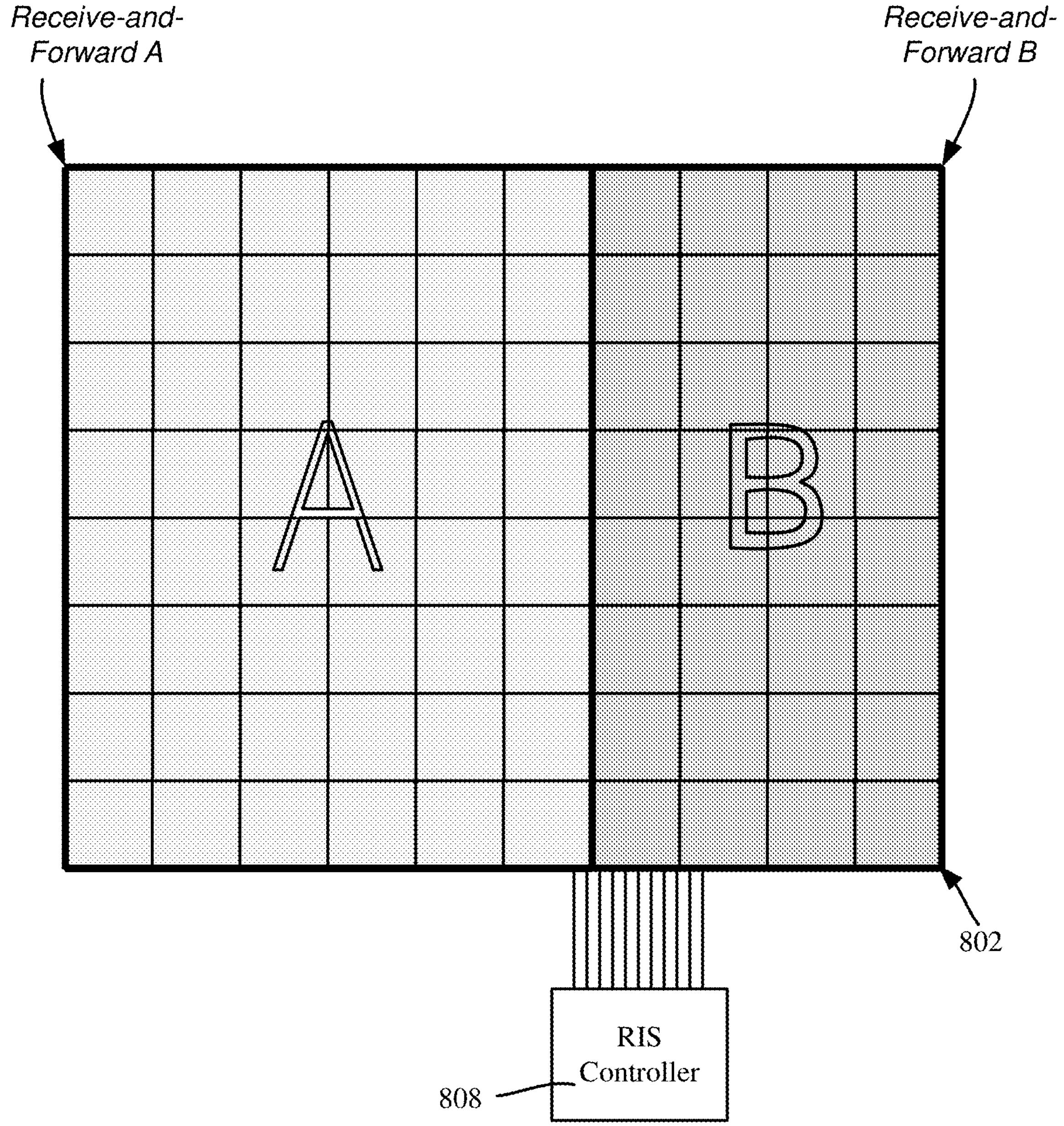
FIG. 8 is a top view representation of yet another example distribution of the communication links in a RIS-assisted wireless communication system based on a subdivided RIS, in accordance with various example embodiments and implementations of the subject disclosure.

For example, if the reconfigurable intelligent surface 702 does not have an allocated transmitter and/or receiver segment (i.e., transmitter segment C and receiver segment D for the BS-reconfigurable intelligent surface control link is optional), as shown in FIG. 7, the reconfigurable intelligent surface does not transmit/receive signals to the BS via a control link. In this case, in order to improve the weaker coverage link between the BS-RIS link and RIS-UE link, the base station can send a control signal to instruct the reconfigurable intelligent surface to change the number of unit cells for the receive-and-forward segment A and, receive-and-forward segment B, as shown in FIG. 8. Thus, reconfigurable intelligent surface receive-and-forward gain can be increased with an increased number of allocated unit cells to improve a weaker link accordingly. For example, when the RIS-UE link is the weaker link compared to the BS-RIS link, and the total number of unit cells in a reconfigurable intelligent surface panel is 1280, the control signal from BS or UE can indicate that number of unit cells for the receive-and-forward segment B is 960, and the number of unit cells for the receive-and-forward segment A is 320. Different ratios as well as the total number of available unit cells can be used in other circumstances, e.g., depending on environmental conditions that can change the relative strength/weakness of the receive-and-forward links.

To summarize, a reconfigurable intelligent surface can be allocated with only receive-and-forward subarrays, such that the RF signal between the base station and the UE has two functions, as shown in the reconfigurable intelligent surface 802 of FIG. 8. The receive-and-forward subarray, segment A, receives the RF signal from the base station, and forwards the RF signal to the UE. In the opposite direction, the receive-and-forward subarray, segment B, receives the RF signal from the UE, and forwards the RF signal to the base station.

Returning to FIGS. 5 and 6, if the reconfigurable intelligent surface transmits/receives signal to and from the base station via a RIS control link, it means that the reconfigurable intelligent surface performs the functions of transmitter C and receiver D. In this scenario, in order to improve the weaker coverage links among the BS-RIS control links, the BS-RIS surface backhaul links, and the RIS-UE links, the base station can send a control signal to instruct the reconfigurable intelligent surface to change the number of unit cells for the receive-and-forward A, receive-and-forward B, Transmitter C, and Receiver D. Thus, the reconfigurable intelligent surface processing gain (receive- and forwarding gain) can be increased with any increased number of allocated unit cells to improve any weaker link accordingly.

Figure 9:
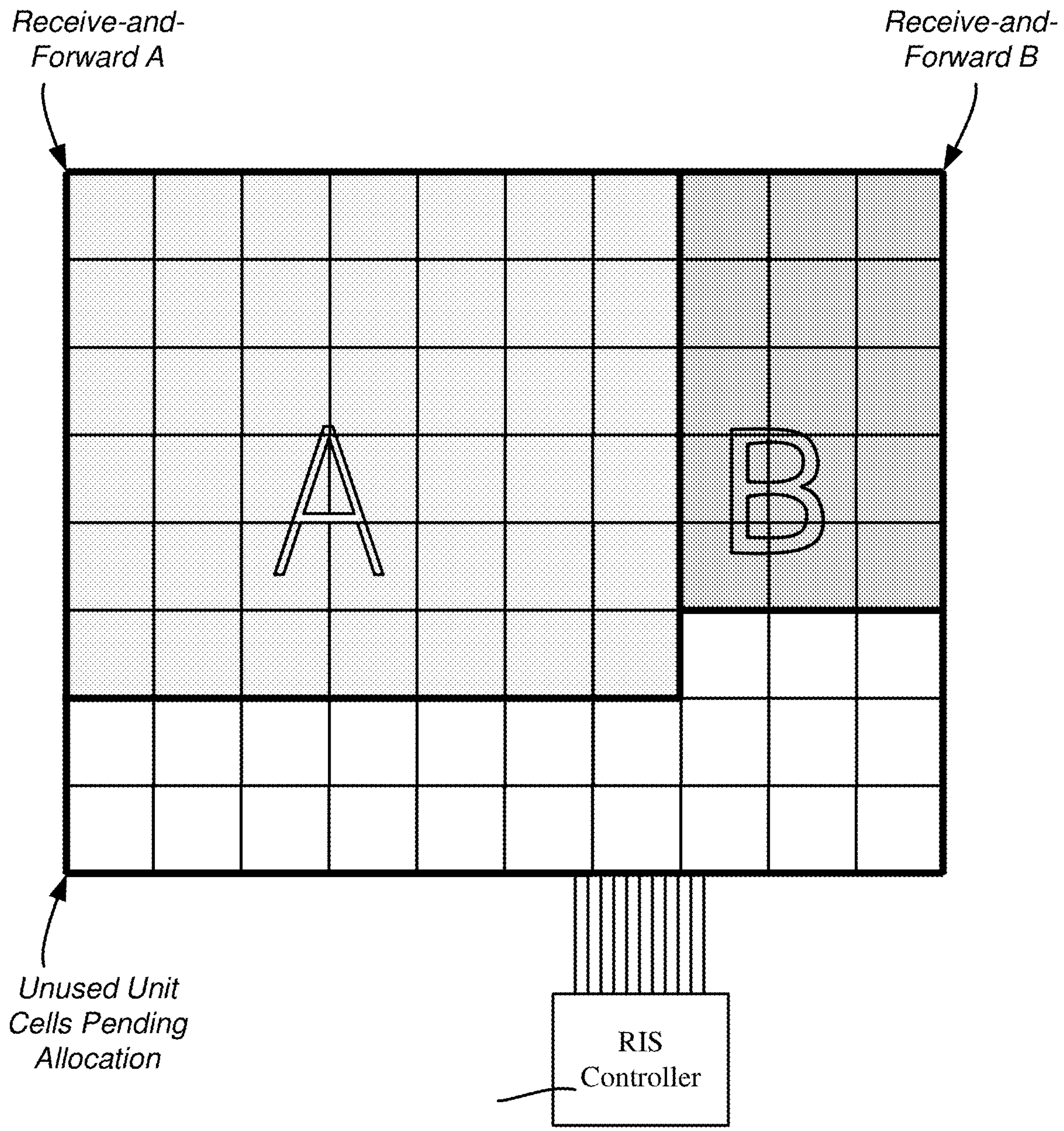
FIG. 9 is a top view representation of an example unit cell subarray allocation with two receive-and-forward segments and unallocated unit cells, in accordance with various example embodiments and implementations of the subject disclosure.

Considering potential interference introduced by a reconfigurable intelligent surface to neighbor nodes, in the event the reconfigurable intelligent surface design has some anomalies, or the interference mitigation is not appropriately considered when designing the panel (with respect to other reconfigurable intelligent surfaces and/or base stations), the base station can instruct the reconfigurable intelligent surface to not use all the unit cells. This reduces interference to other nodes, e.g., to obtain globally optimized performance, as shown in FIG. 9. The unutilized portion can stay as such in case the lower gain is required to mitigate nearby interference, or this portion can be further allocated dynamically to serve low-gain UE/BS links. It is also feasible to use this portion to redirect signals in a direction away from the other node(s) suffering from interference, if the redirected signals in one direction are causing the interference, but not in other direction(s).

Base stations have a global view on network performance and can therefore provide useful input control information to the reconfigurable intelligent surface controller to ensure that the reconfigurable intelligent surface the controller controls is jointly optimized with other nodes (including neighbor base stations and reconfigurable intelligent surfaces). The potential interference introduced by a reconfigurable intelligent surface to neighbor nodes (other reconfigurable intelligent surface(s) or base station(s)), along with and saving power consumption in case only part of the reconfigurable intelligent surface is sufficient to improve coverage or data rate, the base station can instruct the reconfigurable intelligent surface to use some of the unit cells to reduce interference for other nodes to get global optimized performance.

By way of example, consider an embodiment in which the total number of total number of unit cells in a reconfigurable intelligent surface panel is 1280. The control signal from the base station can indicate that number of unit cells for the receive-and-forward A is 240, the number of unit cells for the receiver-and-forward B is 160, the number of unit cells for the transmitter C is 80, and the number of unit cells for the receiver D is 80. The remaining 560 unit cells are unused.

One embodiment is that the base station sends a control signal regarding the allocation of reconfigurable intelligent surface elements or unit cells to the reconfigurable intelligent surface. Another embodiment is that a UE sends a control signal regarding the allocation of the reconfigurable intelligent surface elements or unit cells to the reconfigurable intelligent surface. The control signal can include at least two fields, including a first field that indicates the number of unit-cell(s) for receive-and-forward segment A, such as 64, and a second field that indicates the number of unit-cell(s) for receive-and-forward segment B, such as 16. Optionally, a third field indicates the number of unit-cell(s) for the transmitter segment C, such as 32; optionally, a fourth field indicates the number of unit-cell(s) for the receiver segment D, such as 32.

In alternative, the field about number of unit cells for any of receive-and-forward segment A, receive-and-forward segment B, transmitter segment C, and receiver segment D in the control signal can be set as zero. When this occurs, the base station can control the reconfigurable intelligent surface to not perform a function. For example, when the number of unit-cell(s) for receive-and-forward segment A is set to 0, it means that the reconfigurable intelligent surface temporarily does not need to receive a signal from the BS-RIS backhaul link.

In another alternative, the number of unit-cell(s) indicated in the control signal can be a percentage of the maximum number of unit-cell(s) in a reconfigurable intelligent surface panel or reconfigurable intelligent surface sub-panel. For example, the number of unit-cell(s) for receive-and-forward segment A can be set as 50% of the maximum number of unit-cell(s) in a reconfigurable intelligent surface panel or reconfigurable intelligent surface sub-panel, the number of unit-cell(s) for receive-and-forward segment B is 25%, the number of unit-cell(s) for the transmitter segment C is 12.5%, the number of unit-cell(s) for the receiver segment D is 12.5%. In yet another alternative, the control signal can include the ratio of the number of unit cells/reconfigurable intelligent surface elements among receive-and-forward A, receive-and-forward B, Transmitter C, Receiver D, for example.

When the BS-RIS control link and RIS-UE link/BS-RIS backhaul link are working in the same frequency band and the same time slot, i.e., in full-duplexing mode, it means that receive-and-forward segment A, receive-and-forward segment B, transmitter segment C, and receiver segment D can share all unit cells/reconfigurable intelligent surface elements in the reconfigurable intelligent surface, but use different unit cells in the reconfigurable intelligent surface panel to avoid interference and blockage. In other words, the total number of allocated unit cells for receive-and-forward segment A, receive-and-forward segment B, transmitter segment C, and receiver segment D are no more than the maximum number of unit cells or reconfigurable intelligent surface elements in the reconfigurable intelligent surface as a reconfigurable intelligent surface capability.

When BS-RIS control link and RIS-UE link/BS-RIS backhaul link are working in the same frequency band but in different time slot, i.e., time domain duplexing (TDD) mode, the BS-reconfigurable intelligent surface control link can use all of the unit cells in the reconfigurable intelligent surface panel in a given time slot, while the RIS-UE link and BS-RIS backhaul link can use all numbers of unit cells in the reconfigurable intelligent surface panel in another time slot. The total number of allocated unit cells for receive-and-forward segment A and receive-and-forward segment B are no more than the maximum number of unit cells or reconfigurable intelligent surface elements in a reconfigurable intelligent surface panel as a reconfigurable intelligent surface capability; the total number of allocated unit cells for transmitter segment C and receiver segment D re more than the maximum number of unit cells or reconfigurable intelligent surface elements in a reconfigurable intelligent surface panel as a reconfigurable intelligent surface capability. In this case, time slot allocation, which is associated with allocated unit cells, can be indicated by the base station or UE. The control signal from the base station can include another field, which indicates time slot allocation for associated unit cells allocated for receive-and-forward A and receive-and-forward segment B, or transmitter segment C and receiver segment D.

When the BS-RIS control link and RIS-UE link/BS-RIS backhaul link is working in different frequency resources, i.e., in the frequency domain duplexing (FDD) mode, the frequency allocation, which is associated with allocated unit cells, can be indicated by the base station or UE. The control signal from the base station can include another field, which indicates frequency domain allocation for associated unit cells allocated for receive-and-forward segment A and receive-and-forward segment B, or transmitter segment C and receiver segment D.

Another example embodiment is that the reconfigurable intelligent surface can have at least two sub-panels; one sub-panel of reconfigurable intelligent surface elements or unit cells for receiver-and-forward segment A and receive-and-forward segment B, along with a second sub-panel of reconfigurable intelligent surface elements or unit cells for the transmitter segment C, and receiver segment D. In this case, the RIS controller reports the maximum number of RIS elements or unit-cells in each segment/slice.

Such that the coverage issue can be improved separately for BS-RIS control link, BS-RIS backhaul link and RIS-UE link, a control signal from BS can include at least two fields; one field indicates the number of unit-cell(s) for receive-and-forward A, such as 64 cells; a second field indicates the number of unit-cell(s) for receive-and-forward B, such as 16 cells; the total number of unit-cell(s) for receive-and-forward A and unit-cell(s) for receive-and-forward B should not be more than the maximum number of unit cells in a first reconfigurable intelligent surface segment/slice. The other signal from BS can include a field indicates the number of unit-cell(s) for transmitter C such as 32 cells; the other field indicates the number of unit-cell(s) for receiver D such as 32 cells; the total number of unit-cell(s) for transmitter C and receiver D should not be more than the maximum number of unit cells in a second reconfigurable intelligent surface segment/slice.

Figure 10:
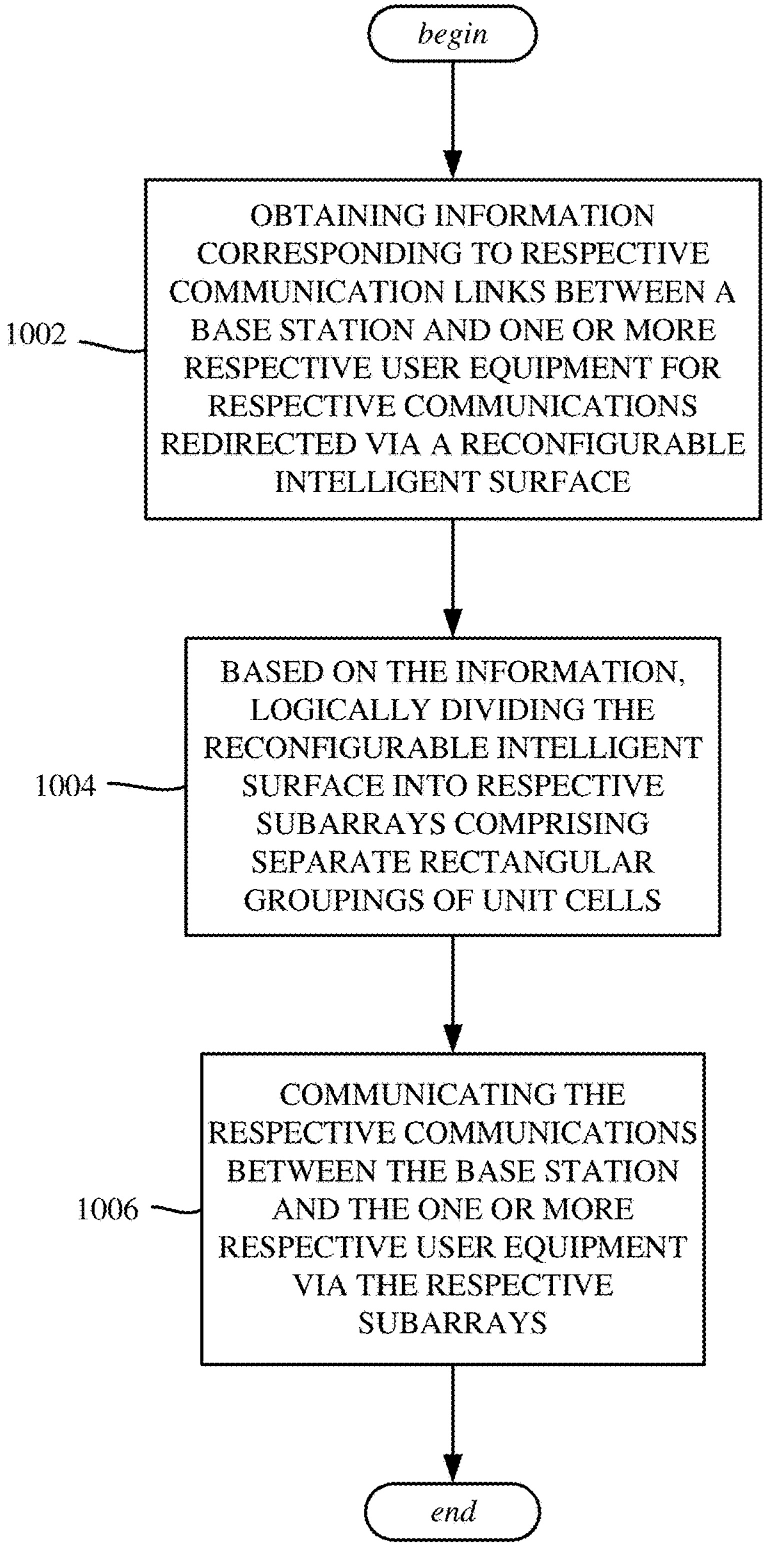
FIG. 10 is a flow diagram showing example operations related to communicating respective communications between a base station and the one or more respective user equipment via respective subarrays of a RIS, in accordance with various example embodiments and implementations of the subject disclosure.

One or more concepts described herein can be embodied in a system, such as represented in the example operations of FIG. 10, and for example can include at least one memory that stores computer executable components and/or operations, and at least one processor that executes computer executable components and/or operations stored in the memory. Example operations can include operation 1002, which represents obtaining information corresponding to respective communication links between the base station and one or more respective user equipment for respective communications redirected via a reconfigurable intelligent surface. Example operation 1004 represents based on the information, logically dividing the reconfigurable intelligent surface into respective subarrays comprising separate rectangular groupings of unit cells. Example operation 1006 represents communicating the respective communications between the base station and the one or more respective user equipment via the respective subarrays.

Logically dividing the reconfigurable intelligent surface into the respective subarrays can include sending control signal data to a controller, coupled to the reconfigurable intelligent surface, to configure the respective subarrays. The information can be first information, the control signal data can be first control signal data, the respective subarrays can be configured as first respective subarrays that can include first separate rectangular groupings of unit cells, and further operations can include obtaining second information corresponding to respective second communication links, and based on the second information, logically dividing the reconfigurable intelligent surface into second respective subarrays, can include sending second control signal data to the controller to reconfigure the first respective subarrays into the second respective subarrays.

The information corresponding to the respective communication links can include first directivity data for a first communication link of the respective communication links, and second directivity data for a second communication link of the respective communication links, and wherein the first directivity data is different from the second directivity data.

The information corresponding to the respective communication links can include first array gain data for a first communication link of the respective communication links, and second array gain data for a second communication link of the respective communication links, and wherein the first array gain data is different from the second array gain data.

The information corresponding to the respective communication links can reserve a first subarray of the respective subarrays for an uplink communication link of the respective communication links for uplink communications to the base station from a user equipment of the one or more respective user equipment, and can reserve a second subarray of the respective subarrays for a downlink communication link of the respective communication links for downlink communications from the base station to the user equipment of the one or more respective user equipment. A first number of unit cells of the first subarray can be different from a second number of unit cells of the second subarray.

Further operations can include reserving a respective subarray of the respective subarrays for communication of uplink control information from the base station to a controller that controls the reconfigurable intelligent surface.

Further operations can include reserving a respective subarray of the respective subarrays for communication of downlink control information from a controller that controls the reconfigurable intelligent surface to the base station.

Further operations can include reserving a respective subarray of the respective subarrays as inactive with respect to redirecting any communications.

Figure 11:
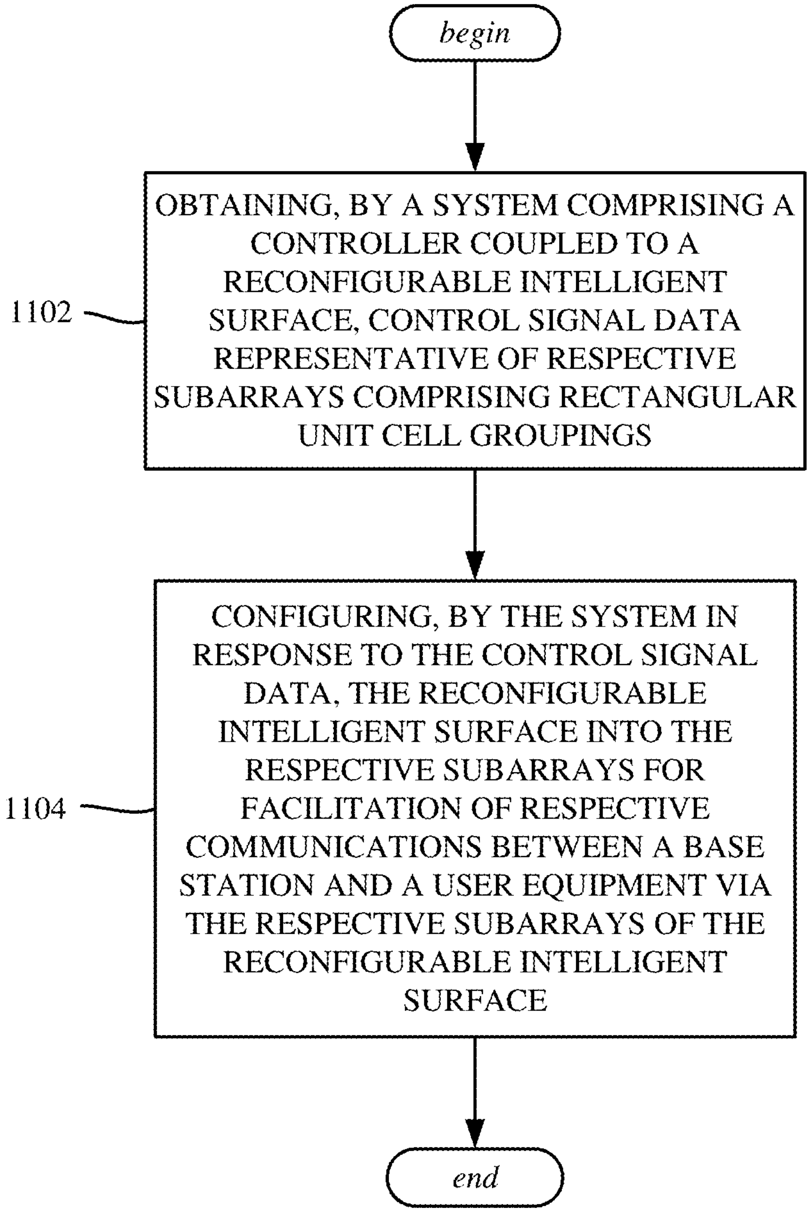
FIG. 11 is a flow diagram showing example operations related to configuring a RIS, based on control signal data, into respective subarrays for facilitation of respective communications between a base station and a user equipment via the respective subarrays of the RIS, in accordance with various example embodiments and implementations of the subject disclosure.

One or more example implementations and embodiments, such as corresponding to example operations of a method, are represented in FIG. 11. Example operation 1102 represents obtaining, by a system that can include a controller coupled to a reconfigurable intelligent surface, control signal data representative of respective subarrays comprising rectangular unit cell groupings. Example operation 1104 represents configuring, by the system in response to the control signal data, the reconfigurable intelligent surface into the respective subarrays for facilitation of respective communications between the base station and a user equipment via the respective subarrays of the reconfigurable intelligent surface.

Configuring the reconfigurable intelligent surface into the respective subarrays can include configuring a first subarray of the respective subarrays for reception of downlink communications from the base station and redirection of the downlink communications to the user equipment, and configuring a second subarray of the respective subarrays for reception of uplink communications from the user equipment and redirection of the uplink communications to the base station.

The downlink communications can be first downlink communications, the uplink communications can be first uplink communications, the user equipment can be a first user equipment corresponding to a first direction, and configuring the reconfigurable intelligent surface into the respective subarrays can include configuring a third subarray of the respective subarrays for reception of second downlink communications from the base station and redirection of the downlink communications to a second user equipment corresponding to a second direction, and configuring a fourth subarray of the respective subarrays for reception of second uplink communications from the second user equipment and redirection of the second uplink communications to the base station.

Configuring the reconfigurable intelligent surface into the respective subarrays can include configuring a first subarray and a second subarray, and wherein the first subarray can include a first rectangular unit cell grouping having a larger number of unit cells relative to a lesser number of unit cells of a second rectangular unit cell grouping of the second subarray.

Configuring the reconfigurable intelligent surface into the respective subarrays can include configuring a first subarray of the respective subarrays for reception of first control link communications from the base station to the controller, and configuring a second subarray of the respective subarrays for transmission of second control link communications from the controller to the base station.

The control signal data can be first control signal data, the respective subarrays can be first respective subarrays, the respective communications can be first respective communications, and further operations can include obtaining, by the system, second control signal data representative of second respective subarrays comprising second rectangular unit cell groupings, and, in response to the second control signal data, reconfiguring, by the system, the reconfigurable intelligent surface into second respective subarrays for facilitation of second respective communications between the base station and the user equipment via the second respective subarrays.

Figure 12:
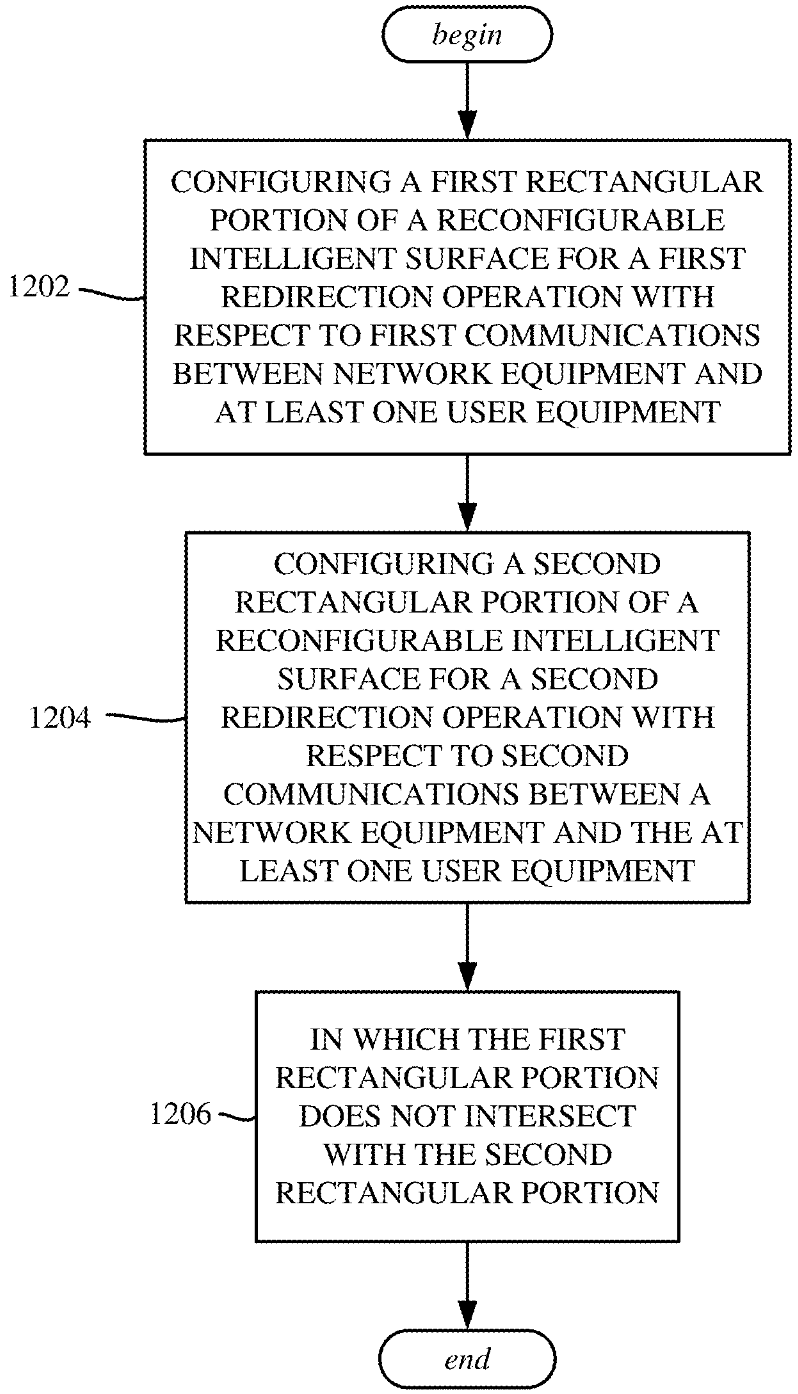
FIG. 12 is a flow diagram showing example operations related to configuring first and second rectangular portions of a RIS for first and second redirection operations with respect to first and second communications between network equipment and at least one user equipment, in accordance with various example embodiments and implementations of the subject disclosure.

FIG. 12 summarizes various example operations, e.g., corresponding to a machine-readable medium, including executable instructions that, when executed by at least one controller, facilitate performance of operations. Example operation 1202 represents configuring a first rectangular portion of a reconfigurable intelligent surface for a first redirection operation with respect to first communications between network equipment and at least one user equipment. Example operation 1204 represents configuring a second rectangular portion of a reconfigurable intelligent surface for a second redirection operation with respect to second communications between a network equipment and the at least one user equipment, the first rectangular portion does not intersect with the second rectangular portion (example block 1206).

Further operations can include configuring a third rectangular portion of the reconfigurable intelligent surface for control communications between the network equipment and the at least one controller, in which the third rectangular portion does not necessarily intersect with the first rectangular portion or the second rectangular portion.

Configuring the first rectangular portion can include configuring a first group of unit cells of the reconfigurable intelligent surface for first uplink communications between the network equipment and the at least one user equipment, and configuring a second group of unit cells of the reconfigurable intelligent surface for second downlink communications between the network equipment and the at least one user equipment; the first group of unit cells can have a first number of unit cells that is different from a second number of unit cells in the second group of unit cells.

Configuring the first rectangular portion can include configuring a first group of unit cells of the reconfigurable intelligent surface for first communications between the network equipment and the at least one user equipment at a first location; the configuring of the second rectangular portion can include configuring a second group of unit cells of the reconfigurable intelligent surface for second communications between the network equipment and the at least one user equipment at a second location, in which the first location can be different from the second location.

As can be seen, the technology described herein is directed to an intelligent reconfigurable surface that can be reconfigured with different subarrays of unit cell groupings to consistently deliver robust coverage under evolving environmental conditions. The reconfiguration can be dynamic, such as to improve coverage with respect to a weaker communications link by allocating more unit cells for communications with that link.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms “component,” “system,” “platform,” “layer,” “selector,” “interface,” and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining information corresponding to respective communication links between a base station and one or more respective user equipment for respective communications redirected via a reconfigurable intelligent surface;

based on the information, logically dividing the reconfigurable intelligent surface into respective subarrays comprising separate rectangular groupings of unit cells, wherein the information comprises capability data indicative of a maximum total number of unit cells of the reconfigurable intelligent surface and a maximum number of unit cells per subarray, and wherein respective numbers of unit cells allocated to the respective subarrays are determined based on the capability data and a desired array gain for respective ones of the communication links; and communicating the respective communications between the base station and the one or more respective user equipment via the respective subarrays.

2. The system of claim 1, wherein the logically dividing of the reconfigurable intelligent surface into the respective subarrays comprises sending control signal data to a controller, coupled to the reconfigurable intelligent surface, to configure the respective subarrays.

3. The system of claim 2, wherein the information is first information, wherein the control signal data is first control signal data, wherein the respective subarrays are configured as first respective subarrays comprising first separate rectangular groupings of the unit cells, and wherein the operations further comprise obtaining second information corresponding to respective second communication links, and based on the second information, logically dividing the reconfigurable intelligent surface into second respective subarrays, comprises sending second control signal data to the controller to reconfigure the first respective subarrays into the second respective subarrays.

4. The system of claim 1, wherein the information corresponding to the respective communication links comprises first directivity data for a first communication link of the respective communication links, and second directivity data for a second communication link of the respective communication links, and wherein the first directivity data is different from the second directivity data.

5. The system of claim 1, wherein the information corresponding to the respective communication links comprises first array gain data for a first communication link of the respective communication links, and second array gain data for a second communication link of the respective communication links, and wherein the first array gain data is different from the second array gain data.

6. The system of claim 1, wherein the information corresponding to the respective communication links reserves a first subarray of the respective subarrays for an uplink communication link of the respective communication links for uplink communications to the base station from a user equipment of the one or more respective user equipment, and reserves a second subarray of the respective subarrays for a downlink communication link of the respective communication links for downlink communications from the base station to the user equipment of the one or more respective user equipment.

7. The system of claim 6, wherein a first number of the unit cells of the first subarray is different from a second number of the unit cells of the second subarray.

8. The system of claim 1, wherein the operations further comprise reserving a respective subarray of the respective subarrays for communication of uplink control information from the base station to a controller that controls the reconfigurable intelligent surface.

9. The system of claim 1, wherein the operations further comprise reserving a respective subarray of the respective subarrays for communication of downlink control information from a controller that controls the reconfigurable intelligent surface to the base station.

10. The system of claim 1, wherein the operations further comprise reserving a respective subarray of the respective subarrays as inactive with respect to redirecting any communications.

11. A method comprising, obtaining, by a system comprising a controller coupled to a reconfigurable intelligent surface, control signal data representative of respective subarrays comprising rectangular unit cell groupings, wherein the control signal data comprises time slot allocation information and frequency domain allocation information for associated ones of unit cells of the rectangular unit cell groupings allocated to at least a first receive-and-forward segment and a second receive-and-forward segment, and to receiver and transmitter segments; and configuring, by the system in response to the control signal data, the reconfigurable intelligent surface into the respective subarrays in accordance with the time slot allocation information and the frequency domain allocation information for facilitation of respective communications between a base station and a user equipment via the respective subarrays of the reconfigurable intelligent surface.

12. The method of claim 11, wherein the configuring of the reconfigurable intelligent surface into the respective subarrays comprises configuring a first subarray of the respective subarrays for reception of downlink communications from the base station and redirection of the downlink communications to the user equipment, and configuring a second subarray of the respective subarrays for reception of uplink communications from the user equipment and redirection of the uplink communications to the base station.

13. The method of claim 12, wherein the downlink communications are first downlink communications, wherein the uplink communications are first uplink communications, wherein the user equipment is a first user equipment corresponding to a first direction, and wherein the configuring of the reconfigurable intelligent surface into the respective subarrays comprises configuring a third subarray of the respective subarrays for reception of second downlink communications from the base station and redirection of the downlink communications to a second user equipment corresponding to a second direction, and configuring a fourth subarray of the respective subarrays for reception of second uplink communications from the second user equipment and redirection of the second uplink communications to the base station.

14. The method of claim 11, wherein the configuring of the reconfigurable intelligent surface into the respective subarrays comprises configuring a first subarray and a second subarray, and wherein the first subarray comprises a first rectangular unit cell grouping having a larger number of unit cells relative to a lesser number of unit cells of a second rectangular unit cell grouping of the second subarray.

15. The method of claim 11, wherein the configuring of the reconfigurable intelligent surface into the respective subarrays comprises configuring a first subarray of the respective subarrays for reception of first control link communications from the base station to the controller, and configuring a second subarray of the respective subarrays for transmission of second control link communications from the controller to the base station.

16. The method of claim 11, wherein the control signal data is first control signal data, wherein the respective subarrays are first respective subarrays, wherein the respective communications are first respective communications, and further comprising obtaining, by the system, second control signal data representative of second respective subarrays comprising second rectangular unit cell groupings, and, in response to the second control signal data, reconfiguring, by the system, the reconfigurable intelligent surface into the second respective subarrays for facilitation of second respective communications between the base station and the user equipment via the second respective subarrays.

17. A non-transitory machine-readable medium, comprising executable instructions that, when executed by at least one controller, facilitate performance of operations, the operations comprising:

configuring a first rectangular portion of a reconfigurable intelligent surface for a first redirection operation with respect to first communications between a network equipment and at least one user equipment; and configuring a second rectangular portion of the reconfigurable intelligent surface for a second redirection operation with respect to second communications between the network equipment and the at least one user equipment, wherein the first rectangular portion does not intersect with the second rectangular portion, and wherein a third rectangular portion of the reconfigurable intelligent surface is configured for control communications between the network equipment and the at least one controller, the third rectangular portion not intersecting with the first rectangular portion or the second rectangular portion, and wherein a number of unit cells of at least one of the first rectangular portion, the second rectangular portion, and the third rectangular portion is different from a number of unit cells of another of the first rectangular portion, the second rectangular portion, and the third rectangular portion.

18. The non-transitory machine-readable medium of claim 17, wherein the configuring of the first rectangular portion comprises configuring a first group of unit cells of the reconfigurable intelligent surface for first uplink communications between the network equipment and the at least one user equipment, and configuring a second group of unit cells of the reconfigurable intelligent surface for downlink communications between the network equipment and the at least one user equipment, and wherein the first group of unit cells has a first number of unit cells that is different from a second number of unit cells in the second group of unit cells.

19. The non-transitory machine-readable medium of claim 17, wherein the configuring of the first rectangular portion comprises configuring a first group of unit cells of the reconfigurable intelligent surface for the first communications between the network equipment and the at least one user equipment at a first location, wherein the configuring of the second rectangular portion comprises configuring a second group of unit cells of the reconfigurable intelligent surface for the second communications between the network equipment and the at least one user equipment at a second location, and wherein the first location is different from the second location.

20. The non-transitory machine-readable medium of claim 17, wherein the operations further comprise:

configuring a transmitter segment and a receiver segment of the reconfigurable intelligent surface, separate from the first rectangular portion and the second rectangular portion, for control communications between the network equipment and the at least one controller.

* * * * *